United States Patent [19]

Matsumoto et al.

[11] Patent Number: 5,337,973
[45] Date of Patent: Aug. 16, 1994

[54] MAGNETIC TAPE CASSETTE

[75] Inventors: Akira Matsumoto; Kiyoo Morita; Takuji Daihisa, all of Kanagawa, Japan

[73] Assignee: Fuji Photo Film Co., Ltd., Kanagawa, Japan

[21] Appl. No.: 974,223

[22] Filed: Nov. 10, 1992

[30] Foreign Application Priority Data

Nov. 13, 1991 [JP] Japan ............... 3-101047[U]

[51] Int. Cl.⁵ ............................................. G03B 1/04
[52] U.S. Cl. ............................................. 242/347
[58] Field of Search ................. 242/197, 198, 199; 360/132

[56] References Cited

U.S. PATENT DOCUMENTS

| | | | |
|---|---|---|---|
| 4,097,006 | 6/1978 | Saito | 242/199 |
| 4,438,860 | 3/1984 | Okamura et al. | 242/197 X |
| 4,466,585 | 8/1984 | Maehara | 242/199 |
| 4,773,614 | 9/1988 | Makino et al. | 242/199 |

FOREIGN PATENT DOCUMENTS 2119753A  11/1983  United Kingdom ........... 242/199

*Primary Examiner*—Daniel P. Stodola
*Assistant Examiner*—John P. Darling
*Attorney, Agent, or Firm*—Sughrue, Mion, Zinn, Macpeak & Seas

[57] ABSTRACT

A magnetic tape cassette which solves the problem of deformation of a guide groove due to a sink mark formed when the neighboring portions of a shaft insertion opening are reduced in thickness to reduce the weight of the cassette case. A tongue-shaped projection is formed adjacent to a central guide groove, the projection including a recessed portion, such as a circular recess or a lateral notch, for reducing the thickness of the projection.

3 Claims, 3 Drawing Sheets

MAGNETIC TAPE CASSETTE

BACKGROUND OF THE INVENTION

The present invention is directed to a magnetic tape cassette comprised of upper and lower cassette halves and, in particular, to an improved structure of a projection formed internally of and integrally with the lower cassette half and disposed between two reels.

Conventional magnetic tape cassettes, as used in audio equipment, video equipment and the like, include a magnetic tape wound around two reels rotatably supported within the cassette case to achieve recording and reproduction.

In such conventional cassettes, the reels or tape winding members are rotatably supported between upper and lower cassette halves, each of the cassette halves being formed from a synthetic resin such as ABS or the like.

There has been an increasing demand for reductions in the weight of the magnetic tape cassette to improve the handling of the cassette and in manufacturing costs. Since the cassettes are mass produced, even a small reduction in weight would prove advantageous.

In order to reduce the weight of a magnetic tape cassette, it is necessary to employ various thicker portions and thinner portions within the cassette. However, since the fluidity of the fused resin is limited when injected, it is difficult to transmit an injection pressure to create these portions. Thus, with respect to a projection (which will be described in detail later) formed within the cassette, a sink or deformation may result due to increased shrinkage of the resin. Since it is difficult to correct the shrinkage, as compared to remaining portions of the cassette, the deformation or sink will remain, forming a significant defect.

FIG. 4 shows a perspective view of one type of conventional lower cassette half 1 for use in a VHS system, and FIG. 5 shows a perspective view of an internal surface of the same lower cassette half 1. The lower cassette half 1 includes right and left drive shaft insertion openings 7, a sensor insertion hole 10 for insertion of a light source which, when inserted, extends along center line C of the cassette so as to emit light in the right and left directions to detect the end of the magnetic tape, a threaded boss hole 11 for accepting a screw to fasten the upper and lower cassette halves together, and a guide groove 9 for guiding the alignment of the upper and lower half cassettes so that they can easily be connected together.

A tongue-shaped projection 32 is provided on the back side of the guide groove 9, that is, on the inner surface of the lower cassette half 1 in the vicinity of a partition wall 5 disposed in the front portion of the cassette, as shown in FIGS. 2 and 3. The projection 32 extends rearwardly from a boss 31 in which the above-mentioned boss hole 11 is formed. As is clearly illustrated in FIG. 3, which is an enlarged perspective view showing the projection 32 from inside the cassette, the projection 32 functions as a support material for forming the guide groove 9. Structures such as the projection 32 and the boss 31, which can increase the thickness of the case, are localized at a certain position within the cassette so that differences in thickness and mass distribution at the localized areas, as compared to the remaining portions, are increased.

Since it is desirable to reduce the thickness of the portions surrounding the shaft insertion openings 7, in order to reduce the weight of the cassette case, the differences in thickness between the projection 32 and its neighboring portions may be even further exaggerated.

As noted above, a deformation or sink mark may be formed in the vicinity of the projection 32 as a consequence of the reduction in thickness of portions of the cassette. The sink mark impairs the appearance of the surface of the finished product as well as its commercial value. Also, it is difficult to obtain an even mechanical strength in these portions. Further, since such deformations are usually located at or near a portion which forms the guide groove 9, as described above, even a slight deformation can make it difficult to insert the cassette into a bucket of the VCR or other recording/playback device.

SUMMARY OF THE INVENTION

The present invention is intended to eliminate the above described drawbacks of the conventional magnetic tape cassette. It is, therefore, an object of the present invention to provide a magnetic tape cassette which can prevent deformations or sinks from being formed in the guide groove portion, even if the thickness of the portions surrounding the shaft insertion opening are made thin for reducing the weight of the cassette case.

In order to achieve the above object, according to the present invention, a magnetic tape cassette is provided in which a pair of tape winding members are rotatably mounted in a cassette case including upper and lower half cases and around which a magnetic tape is wound, and a guide groove is provided on the lower cassette half at a position corresponding to a cassette insertion guide projection disposed in a bucket of a recording and/or reproducing device, a tongue-shaped projection being provided along the inner surface of the lower cassette half in the central portion of the cassette, as measured in the lateral direction thereof, said projection including a recessed portion for reduction of the thickness.

DESCRIPTION OF THE PREFERRED EMBODIMENTS

A detailed description is provided below of an embodiment of a magnetic tape cassette according to the present invention with reference to the accompanying drawings.

Figure 1:
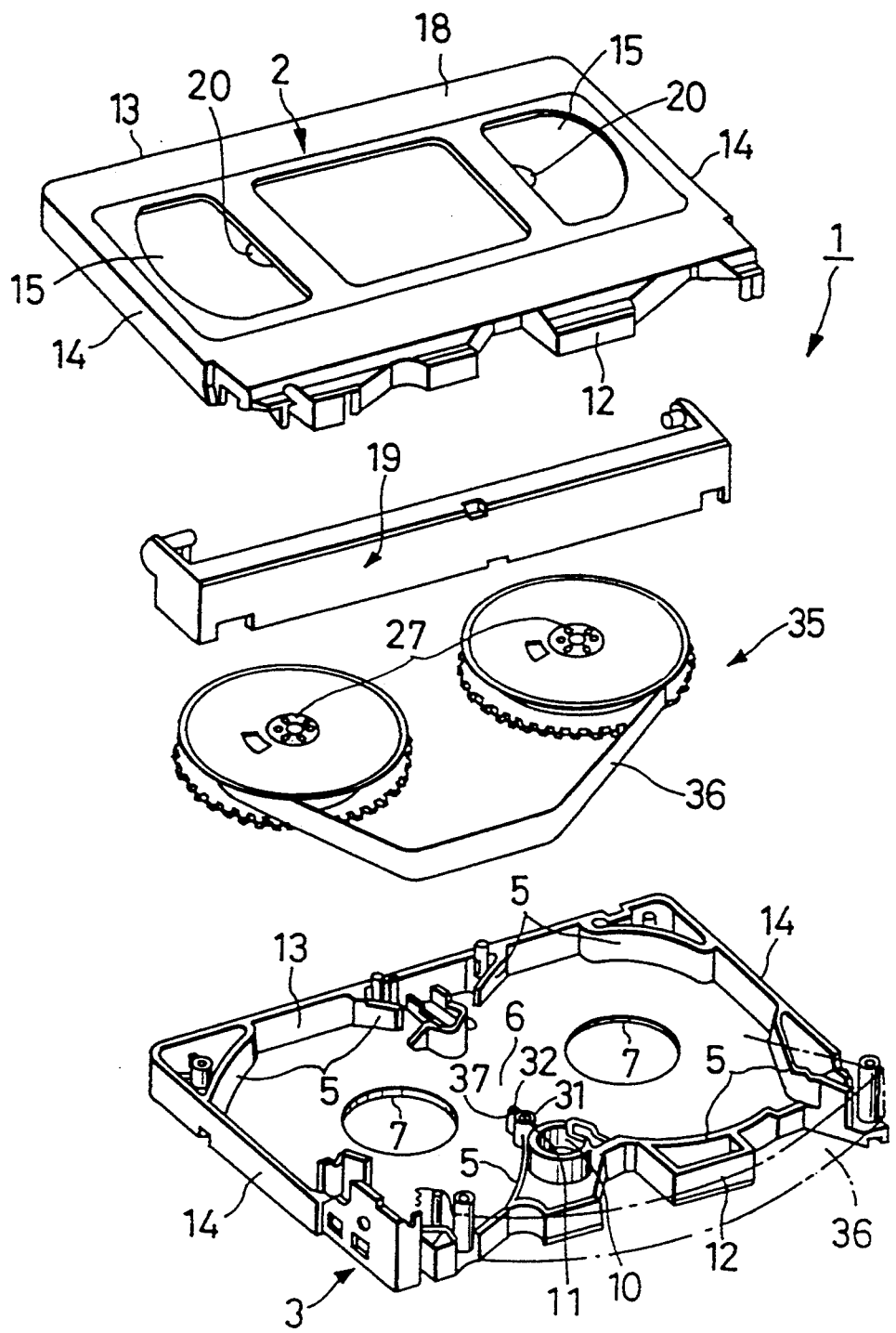
FIG. 1 is an exploded perspective view of a magnetic tape cassette according to the present invention.
Figure 2:
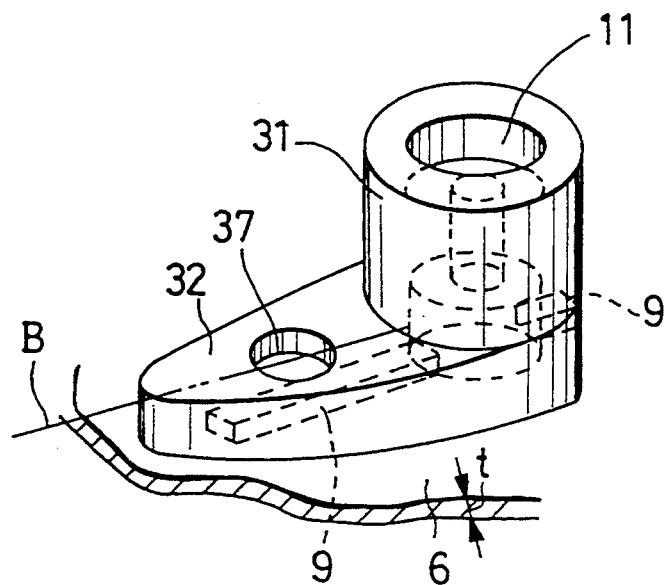
FIG. 2 is an enlarged perspective view of a part of a lower cassette half shown in FIG. 1.

FIG. 1 is an exploded perspective view of a magnetic tape cassette for use in a VCR of a VHS system according to the present invention, and FIG. 2 is an enlarged perspective view of a projection in a magnetic tape cassette according to one embodiment of the present invention.

The tape cassette 1 shown in FIG. 1 generally includes a pair of tape reels 35 rotatably mounted within a cassette case and a magnetic tape 36 wound therearound. The cassette case is formed from an upper cassette half 2 and a lower cassette half 3, and includes a tape draw-out opening formed in a front portion thereof, which opening is covered with a guard panel 19.

The upper cassette half 2 is generally box-shaped and includes front and rear side walls 12, 13 and right and left side walls 14, 14, each wall extending from the peripheral edges of a rectangularly shaped upper wall surface 18 having window openings. The upper cassette half 2 is integrally formed by injection molding or the like. Transparent window members 15 are secured along peripheral edges of the window openings. A leaf spring 20 is fixed to an inner central portion of the inside upper wall of the cassette half 2, which spring is used to bias the tape reels 35 downwardly toward the bottom of the cassette. A free end of the leaf spring 20 is made to abut against a projection provided in the center of the upper end face of the tape reels 35.

The lower cassette half 3 is generally box-shaped and includes a front side wall 12, a rear side wall 13 and right and left side walls 14, 14, each wall extending from the peripheral edges of a rectangular bottom wall surface 6. Shaft insertion openings 7 are formed in the bottom wall surface 6, which openings 7 receive the drive shafts of the recording/reproducing device, the drive shafts being inserted into the reel hubs of the tape reels 35. The positions of the tape reels 35 are restricted in the horizontal direction by partition walls 5 extending from the upper wall surface 18 and bottom wall surface 6 so as to surround the tape reels 35. Other members to be incorporated into the lower cassette half 3 are not shown for simplification of the figures.

The upper and lower cassette halves 2, 3 may, for example, be formed from ABS resin, and the tape reels 35 may, for example, be formed from polystyrene (GPPS) resin, although these parts are not limited to these materials.

As shown in FIG. 2, a circular-shaped recessed portion 37 is formed in the projection 32 which overlies the groove 9, for thickness reduction of the projection 32. The recessed portion 37 is formed at the midpoint of the projection 32, as measured along line B in FIG. 2, which line extends frontwardly and rearwardly, i.e., in the longitudinal direction so as to reduce the substantial thickness of the projection 32 along the longitudinal direction. By forming the recessed portion 37 in this fashion, the above described resin sink mark can be eliminated.

As a result, deformations of the guide groove 9 and the portions of the cassette bottom surface 6 adjoining the guide groove 9 are prevented. The depth of the recessed portion 37 is set with respect to the depth of the guide groove 9 such that it does not adversely affect the mechanical strength of the guide groove 9.

Figure 3:
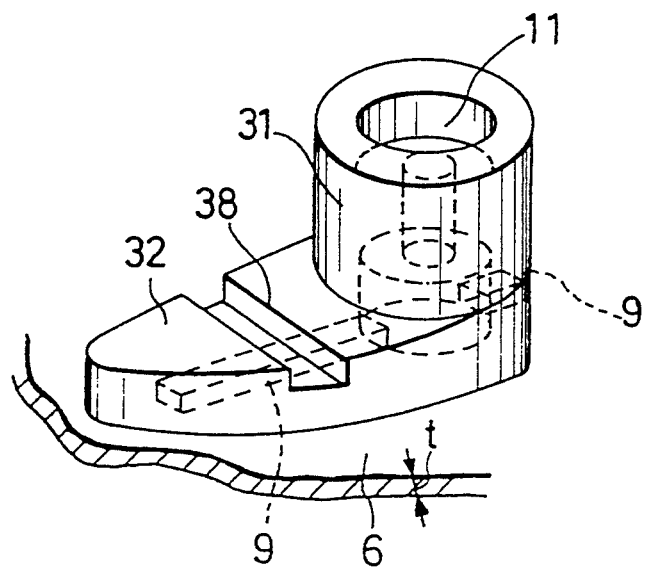
FIG. 3 is an enlarged perspective view of a part of a lower cassette half according to a different embodiment of the present invention.
Figure 4:
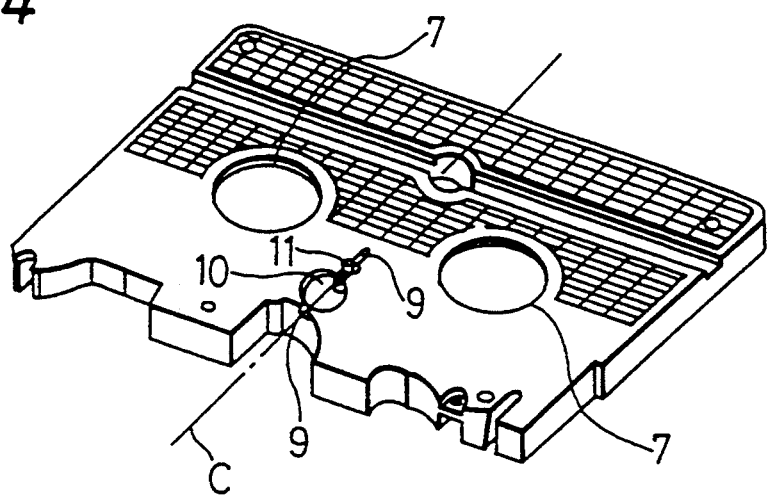
FIG. 4 is a perspective view of a lower surface of a conventional lower cassette half.
Figure 5:
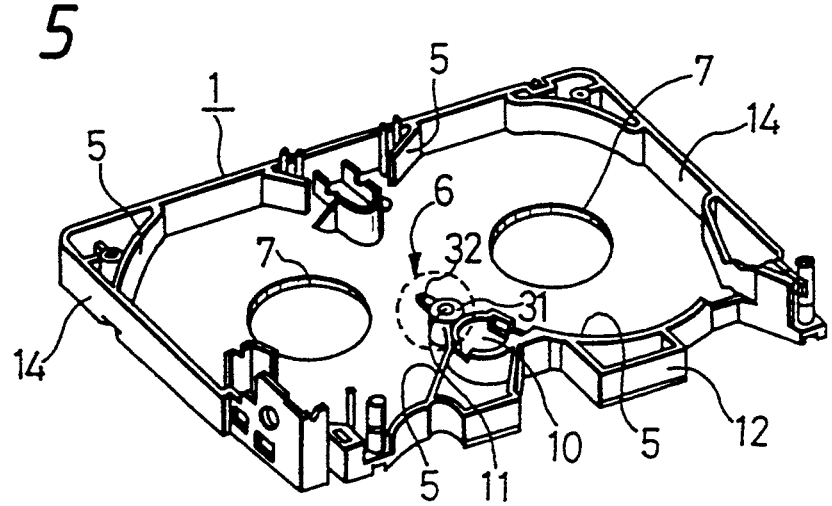
FIG. 5 is a perspective view of an inner surface of the same lower cassette half shown in FIG. 4.
Figure 6:
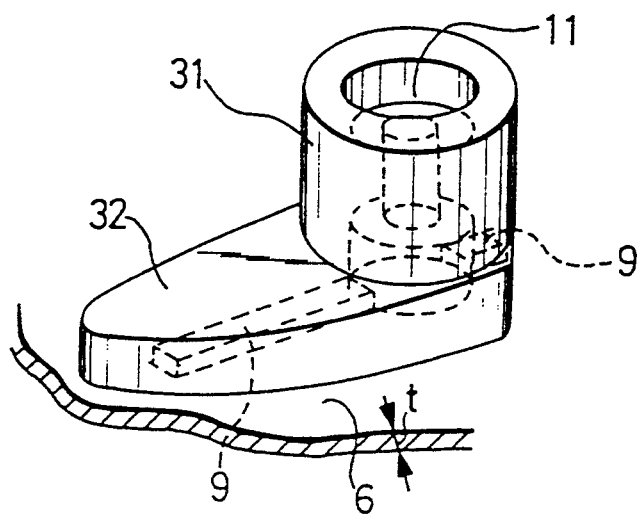
FIG. 6 is an enlarged perspective view of a part of a conventional lower cassette half.

FIG. 3 shows another embodiment of a magnetic tape cassette according to the present invention. In this embodiment, a groove-shaped recessed portion 38 extends in the right and left direction, i.e., laterally. This groove-shaped recessed portion 38 is also configured so that it does not impair the mechanical strength of the portion where the guide groove 9 is formed.

In the above-described embodiments, the recessed portions 37, 38 are formed in a circular shape or a rectangular-groove shape. However, the present invention is not limited to such shapes. Other shapes such as triangular and elliptical shapes may be used. Further, although the present embodiments employ a single recessed portion, the number of the recessed portions is not limited to one. Rather, a plurality of recessed portions may be formed.

As has been described above, according to the present invention, in order to form a guide groove corresponding a cassette insertion guide projection provided in the bucket of a recording/reproduction device, a tongue-shaped projection is provided on the inner surface of a lower cassette half in the central portion of the cassette as measured in the lateral direction thereof, and a recessed portion is provided in the tongue-shaped projection for reduction of the thickness of the projection. This structure minimizes the substantial thickness of the tongue-shaped projection adjacent to guide groove and, therefore, makes it is possible to prevent deformations from being formed in the cassette, such as resin sink marks, when the fluidity of the fused resin is limited by a difference in thickness between the abovementioned projection portion and its neighboring portions. In accordance with the present invention, even if the thickness of portions near the shaft insertion opening is reduced to decrease the weight of the cassette case, it is still possible to effectively prevent the formation of resin sink marks which could cause deformation of the guide groove and to avoid further deformation of the cassette case occurring as a result of the reduced weight of the cassette case.

What is claimed is:

1. A magnetic tape cassette comprising:
    a cassette case including upper and lower cassette halves, a guide groove being formed on a lower face of said lower cassette half, said guide groove being disposed at a center of said lower face, as measured laterally, and extending longitudinally along said lower face;
    a pair of tape winding members rotatably supported within said cassette case;
    a magnetic tape wound around said members; and
    a tongue-shaped projection disposed on an inner surface of said lower cassette half overlying and covering said guide groove to support said guide groove, and including a recessed portion to provide a reduced thickness portion of said projection.

2. A magnetic tape cassette as recited in claim 1, wherein said recessed portion is circular in cross section and is disposed at a center of said projection, as measured laterally.

3. A magnetic tape cassette as recited in claim 1, wherein said recessed portion is a notch, said notch extending laterally.

* * * * *